Oct. 26, 1954  S. J. STEENSEN  2,692,507
ARRANGEMENT FOR THE TRANSMISSION OF
CIRCULAR MOVEMENT FOR COMPRESSORS
Filed April 28, 1950
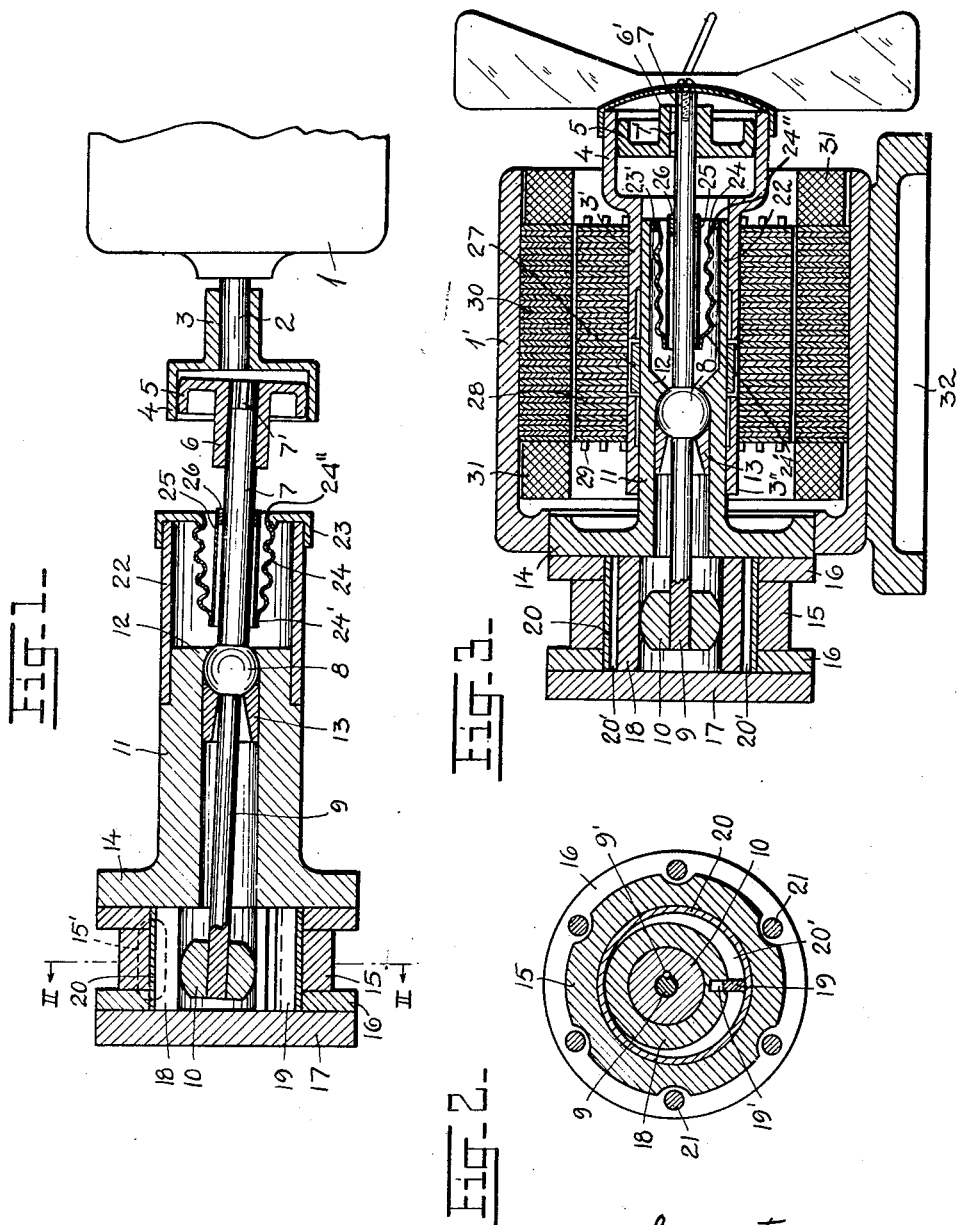
Inventor
Sverre Johan Steensen
by Sommers & Young
Attorneys

UNITED STATES PATENT OFFICE 2,692,507

ARRANGEMENT FOR THE TRANSMISSION OF CIRCULAR MOVEMENT FOR COMPRESSORS

Sverre Johan Steensen, Oslo, Norway

Application April 28, 1950, Serial No. 158,653

1 Claim. (Cl. 74—18.1)

The present invention relates to an arrangement for the transmission of circular movement for compressors of the "rollator type," that is, a compressor having a cylindrical pump compartment along the inner cylindrical wall of which a cylindrical armature, in the following called the "rollator," is forced to roll in contact with said inner wall.

In connection with refrigerating plants it is a problem to avoid refrigerating liquid from leaking out through stuffings in cases where the compressor is driven by a motor the shaft of which is passed through the compressor housing and packed by a stuffing means. Said problem disappears if the motor be located within the compressor housing. However, in such case a further motor is necessary for driving the cooling fan. Another way to avoid said problem is to drive the compressor by a motor through a magnetic coupling having its driving and driven members separated by a thin-walled housing containing the compressor. However, a mechanical transmission is to be preferred, and the invention is aimed at solving the problem in a mechanical way.

The arrangement for the transmission of circular movement for compressors of the "rollator" type is distinguished by the provision of a wobble shaft pivoted intermediate its ends by a spherical bearing member for universal movement, which spherical member bears in a complementary bearing socket, and has a resilient gas-tight packing arranged between said shaft and its bearing socket.

The resilient gas-tight packing may be made in many different ways, but an embodiment having a bellows or a concentrically corrugated diaphragm is preferred.

The invention will be better understood from reading the following description of the drawing showing two embodiments of the invention.

In the drawing:

Fig. 1 represents a longitudinal section through the transmitting device connecting the driving motor with the driven compressor;

Fig. 2 a section of the compressor along line II—II in Fig. 1, and

Fig. 3 a modification showing the driving motor arranged exteriorly to the transmitting device.

A compressor of the "rollator" type is driven by a motor 1 through a transmitting device 4, 5, 7, 8, 9, 10. Only the essential parts of the compressor are shown, namely, the two end walls 14 and 17 and a thin-walled metal cylinder 20, which parts together form the pump compartment 20'. In said compartment is placed a "rollator" which forms the moving part of the compressor and which consists in a relatively thick-walled, open ended hollow cylinder 18 having a radial slot 19' for a blade 19 forming a partition between the pressure side and the suction side of the compressor compartment 20'.

Said rollator is kept in contact with the cylinder wall 20 by a permanent annular magnet 15 magnetized in radial direction and provided with annular pole pieces 16. The path of the lines of force is indicated by the stroke-dashed line 15'. The bolts for keeping the different stationary parts of the compressor together are numbered 21. For sake of simplicity the inlet and outlet ports of the compressor have been omitted in the drawing since the compressor itself does not form any part of the present invention.

The rollator 18 is moved in rolling contact with the inner wall of the hollow cylinder 20 by a wobble shaft 7, 9 pivoted intermediate its ends by a spherical bearing member 8 which is mounted in a complementary bearing socket 12. Said bearing socket is formed by the end wall 14 of the compressor being provided with a tube shaped extension 11 the free end of which forms said bearing socket 12. The spherical member 8 is maintained in position in the socket 12 by the bearing sleeve 13 inserted into the tube shaped extension 11 from the left end of extension 11.

A ball-like member 10, which is located within the rollator 18, as shown, is fixed to the inner end 9 of the shaft by means of a key 9'. The wobble shaft is pivoted for universal movement, that is, so as to be swung in all directions without any possibility of movement in its axial direction. The shaft 7, 9 is to be moved so that its ends will describe circles and its axis the surface of a double cone. Said circular movement is obtained by an eccentric driving device 4, 5 one member (4) of which is fixed to shaft 2 of motor 1 by hub 3 and the other member (5) of which is fixed to the free end of shaft member 7 by hub 6. Member 5 is the concentric part and member 4 the eccentric part surrounding member 5 so that said end of shaft 7 will be carried along a circular path when member 4 is rotated by motor 1.

The advantage of the "rollator" is that its driving means needs not rotate provided its driving part is brought to describe a circle having a desired radius. This is just the case with the wobble shaft described above. The circular movement of the inner end of the wobble shaft 7, 9 carrying the member 10 will cause the "rollator" to roll along the inner wall of the cylinder 20. Since said wobble shaft does not rotate, the problem of stuffing said shaft is very simple, and the drawing shows an embodiment of a resilient gas-tight packing, in the present case comprising a thin-walled, elongated, substantially cylindrical metal bellows 24, one end of which is sealed to the stationary part of the compressor and the other end of which is sealed to the shaft. It is obvious that the packing may be arranged on any side relative to the spherical member but in order to facilitate the mounting it is preferred to arrange same as shown in Fig. 1, namely connected with the driven part 7 of the shaft. For this purpose the tube shaped extension 11 has a further tubular extension 22, the free end of which is provided with a ring shaped termination 23 sealed to the outer end 24" of the bellows 24. The inner end 24' may either be directly sealed to the shaft 7 or, as in the present case, connected with the shaft by a thin-walled sleeve 25, the outer end of which being sealed to the shaft by a ring 26. In order to obtain the longest possible life time of the packing, it is of importance that same be fixed to the shaft as near the fulcrum of the shaft, that is, as near member 8, as possible, so that the movement of the bellows will be very small.

The gas-tight resilient stuffing may be executed in many different ways, such as a soft, compressible stop of rubber or the like which is pushed in between shaft 9 or 7 and the tube shaped extension surrounding the shaft, that is, 22 or 11, respectively. Also the resilient stop is preferably pushed as near member 8 as possible.

Another resilient stuffing may consist in a concentrically corrugated diaphragm, the outer periphery of which being sealed to part 11 with the periphery of its central opening sealed to the spherical member 8, or to the shaft part 7 or 9 as near said member as possible.

Fig. 3 shows a preferred combination of the transmitting device and the drawing motor, the armature 28 of which being arranged rotatably on the exterior of the tube shaped extensions 11, 22 with bearing sleeves 3' and 3" interposed therebetween. Of these sleeves, sleeve 3' has been extended so as to form the one part 4 of the eccentric device 4, 5. In order to prevent both sleeves 3' and 3" from being pushed to mutually abut, the tube shaped extension 22 has been provided with a stationary ring 27 as shown in Fig. 3. The numbering of the parts of the transmitting device which correspond with the same parts in Fig. 1 is the same.

The motor armature 28 as well as the stator 30 of the same are in the usual way built up from iron sheets. The magnetizing winding of the stator is numbered 31. In the present case a squirrel cage motor is shown. The armature bars forming the cage are numbered 29. The outer housing of the motor is numbered 1' and is threaded upon the end disk 14 of the compressor as shown. The motor has also a socket 32 directly fixed to the housing 1'.

As already mentioned, the central axis of shaft 7, 9 will describe a double cone having a common apex. At a given eccentricity of the eccentric device 4, 5 the top angle of the cones may be adjusted by displacing the driven part 5 of the eccentric axially on the shaft part 7. For this purpose the hub 6 of the eccentric wheel 5 is fixed to the end of the shaft part 7 by a key 7' which allows movement in an axial direction. Thereby it is also possible to adjust for wear between the member 10 and the rollator 18.

I claim:

An arrangement for the transmission of circular movement for compressors of the type comprising a cylindrical pump compartment, along the inner cylindrical wall of which a cylindrical piston of a somewhat smaller diameter than the diameter of the pump compartment is forced to roll in contact with said inner wall, which arrangement comprises a wobble shaft pivoted intermediate its ends by a spherical bearing member for universal movement of said shaft, which spherical member is borne in a complementary bearing socket, said bearing socket having a tubular extension extending along said shaft opposite the compressor, a resilient gas-tight packing arranged between said wobble shaft and its bearing socket, which resilient gas-tight packing is in the form of an elongated, substantially cylindrical bellows which surrounds the shaft having one end sealed to the shaft near said spherical bearing member and the other end sealed to said tubular extension of said bearing socket, said tubular extension surrounding said shaft and said cylindrical bellows, and a tube arranged concentrically to said bellows and to said shaft, and having its end which is nearest to said spherical bearing member sealed to the end of the bellows which is also nearest to said bearing member, and having its other end sealed to said shaft.

References Cited in the file of this patent

UNITED STATES PATENTS

| Number | Name | Date |
|---|---|---|
| 1,378,118 | Jacobsen et al. | May 17, 1921 |
| 2,065,834 | Swennes | Dec. 29, 1936 |
| 2,107,090 | Swennes | Feb. 1, 1938 |

FOREIGN PATENTS

| Number | Country | Date |
|---|---|---|
| 444,970 | Great Britain | Apr. 1, 1936 |